United States Patent
Melia et al.

(10) Patent No.: US 10,517,058 B2
(45) Date of Patent: Dec. 24, 2019

(54) TRANSPORT OF MULTIHOMING SERVICE RELATED INFORMATION BETWEEN USER EQUIPMENT AND 3GPP EVOLVED PACKET CORE

(75) Inventors: Telemaco Melia, Nozay (FR); Yacine El Mghazli, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 13/580,701

(22) PCT Filed: Feb. 16, 2011

(86) PCT No.: PCT/EP2011/052267
§ 371 (c)(1),
(2), (4) Date: Nov. 8, 2012

(87) PCT Pub. No.: WO2011/104149
PCT Pub. Date: Sep. 1, 2011

(65) Prior Publication Data
US 2013/0058275 A1    Mar. 7, 2013

(30) Foreign Application Priority Data

Feb. 23, 2010 (EP) .................................. 10290091

(51) Int. Cl.
*H04W 60/00* (2009.01)
*H04W 12/02* (2009.01)
(Continued)

(52) U.S. Cl.
CPC .......... *H04W 60/005* (2013.01); *H04W 12/02* (2013.01); *H04W 12/04* (2013.01); *H04W 88/06* (2013.01); *H04W 99/00* (2013.01)

(58) Field of Classification Search
USPC ........................................................ 370/328
See application file for complete search history.

(56) References Cited

U.S. PATENT DOCUMENTS 7,907,948 B2    3/2011   Haddad et al.
8,477,724 B2 *  7/2013   Bakker ............ H04W 36/0033
                                                 370/331
(Continued)

FOREIGN PATENT DOCUMENTS

CN    101499953 A    8/2009
EP    1 926 277 A1   5/2008
(Continued)

OTHER PUBLICATIONS

International Search Report for PCT/EP2011/052267 dated May 18, 2011.
(Continued)

*Primary Examiner* — Bunjob Jaroenchonwanit
(74) *Attorney, Agent, or Firm* — Fay Sharpe LLP

(57) ABSTRACT

In an embodiment, there is provided a method for the transport of multihoming service related information between User Equipement UE and 3GPP Evolved Packet Core EPC through untrusted non 3GPP Access Network, said method comprising a step of:
transporting multihoming service related information using signaling exchanged for security procedures between UE and an evolved Packet Data Gateway ePDG of said untrusted non 3GPP Access Network.

18 Claims, 5 Drawing Sheets

(51) Int. Cl.
*H04W 88/06* (2009.01)
*H04W 99/00* (2009.01)
*H04W 12/04* (2009.01)

(56) References Cited

U.S. PATENT DOCUMENTS

| | | |
|---|---|---|
| 8,619,629 B2 | 12/2013 | Hirano et al. |
| 9,282,487 B2* | 3/2016 | Sun .................. H04L 45/38 |
| 2006/0126645 A1* | 6/2006 | Devarapalli ........ H04L 63/0272 370/401 |
| 2006/0274750 A1 | 12/2006 | Babbar et al. |
| 2008/0162924 A1 | 7/2008 | Chinitz et al. |
| 2009/0265767 A1 | 10/2009 | Rune et al. |
| 2010/0199332 A1* | 8/2010 | Bachmann .......... H04L 63/0428 726/4 |
| 2011/0035787 A1* | 2/2011 | Naslund .................. H04L 63/08 726/3 |
| 2011/0096660 A1* | 4/2011 | Ikeda ................... H04W 36/36 370/225 |
| 2011/0103260 A1 | 5/2011 | Jeyatharan et al. |
| 2011/0189971 A1* | 8/2011 | Faccin ................. H04W 76/02 455/404.1 |
| 2012/0204253 A1* | 8/2012 | Sugimoto ........... H04L 12/4633 726/12 |
| 2013/0308482 A1* | 11/2013 | LeBlanc ................ H04L 45/24 370/252 |
| 2015/0341788 A1* | 11/2015 | Naslund ................. H04L 63/08 370/329 |

FOREIGN PATENT DOCUMENTS

| | | |
|---|---|---|
| EP | 1926277 A1 * | 5/2008 ......... H04L 63/1458 |
| EP | 1 993 257 A1 | 11/2008 |
| EP | 1993257 A1 * | 11/2008 ......... H04L 12/4633 |
| EP | 2 071 767 A1 | 6/2009 |
| JP | 2008-538671 | 10/2008 |
| JP | 2008-546321 A | 12/2008 |
| WO | WO 2008/155066 | 12/2008 |
| WO | WO 2009/002844 A2 | 12/2008 |
| WO | WO 2009/126083 A1 | 10/2009 |
| WO | WO 2010/010695 | 12/2009 |
| WO | WO 2009/153943 | 1/2010 |

OTHER PUBLICATIONS

English Bibliography for Japanese Patent Application Publication No. JP2008546321A, published Dec. 18, 2008, printed from Derwent Innovation on Feb. 23, 2018, 4 pp.
3GPP TR 23.861 V1.3.0 (Sep. 2009), Technical Specification Group Services and System Aspects, Multi-access PDN connectivity and IP flow mobility, (Release 9), 49 pp.

* cited by examiner

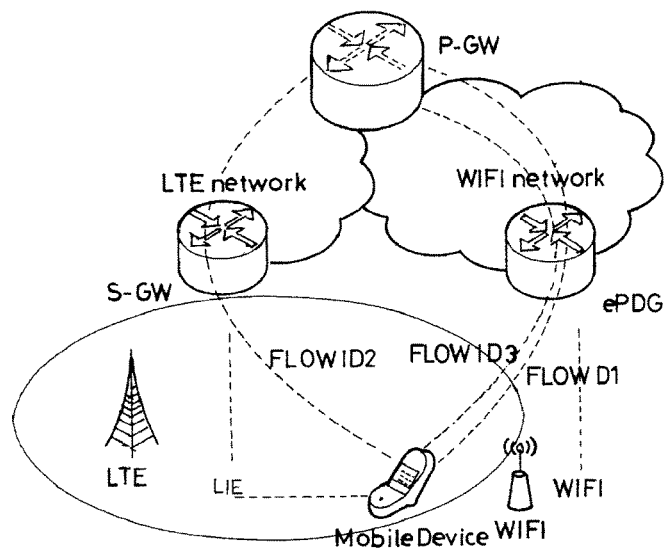
FIG_2
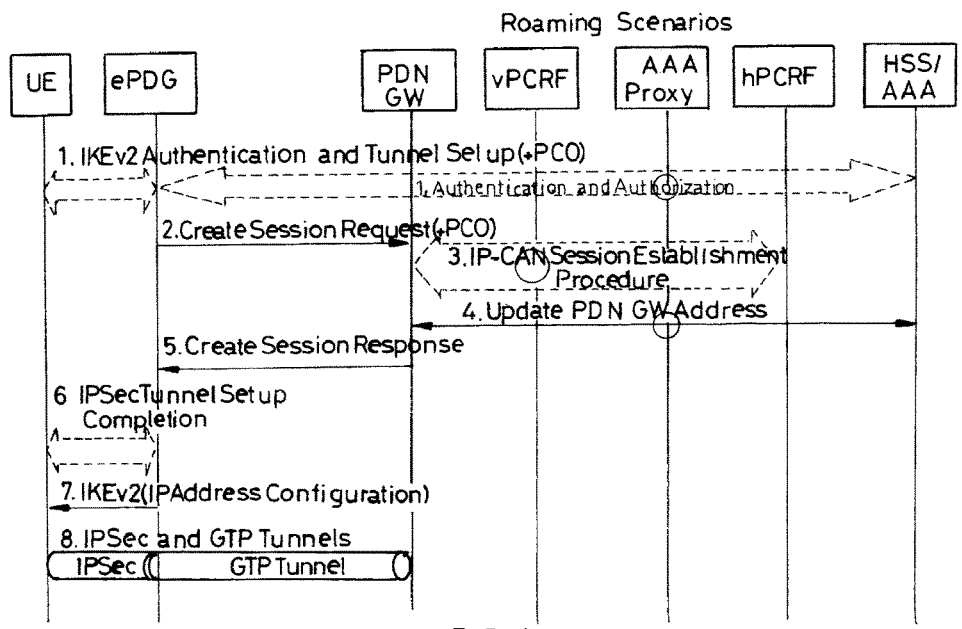
FIG_4

FIG_3
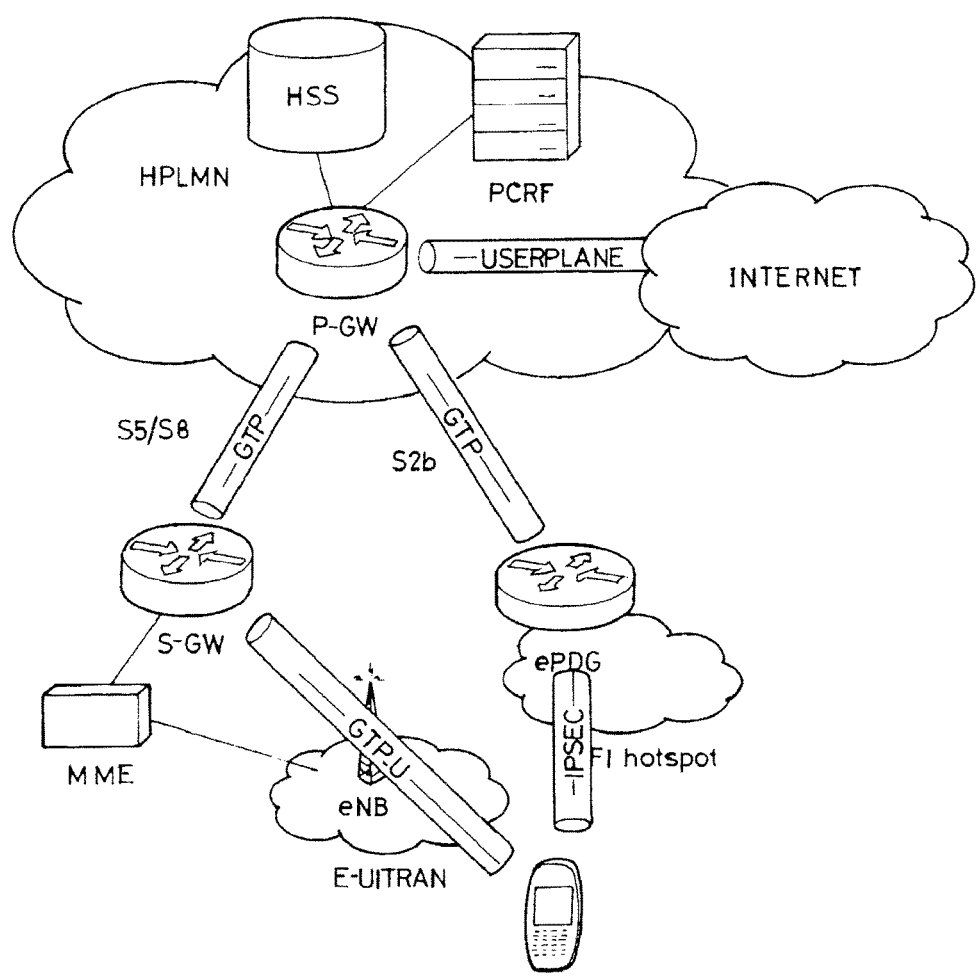

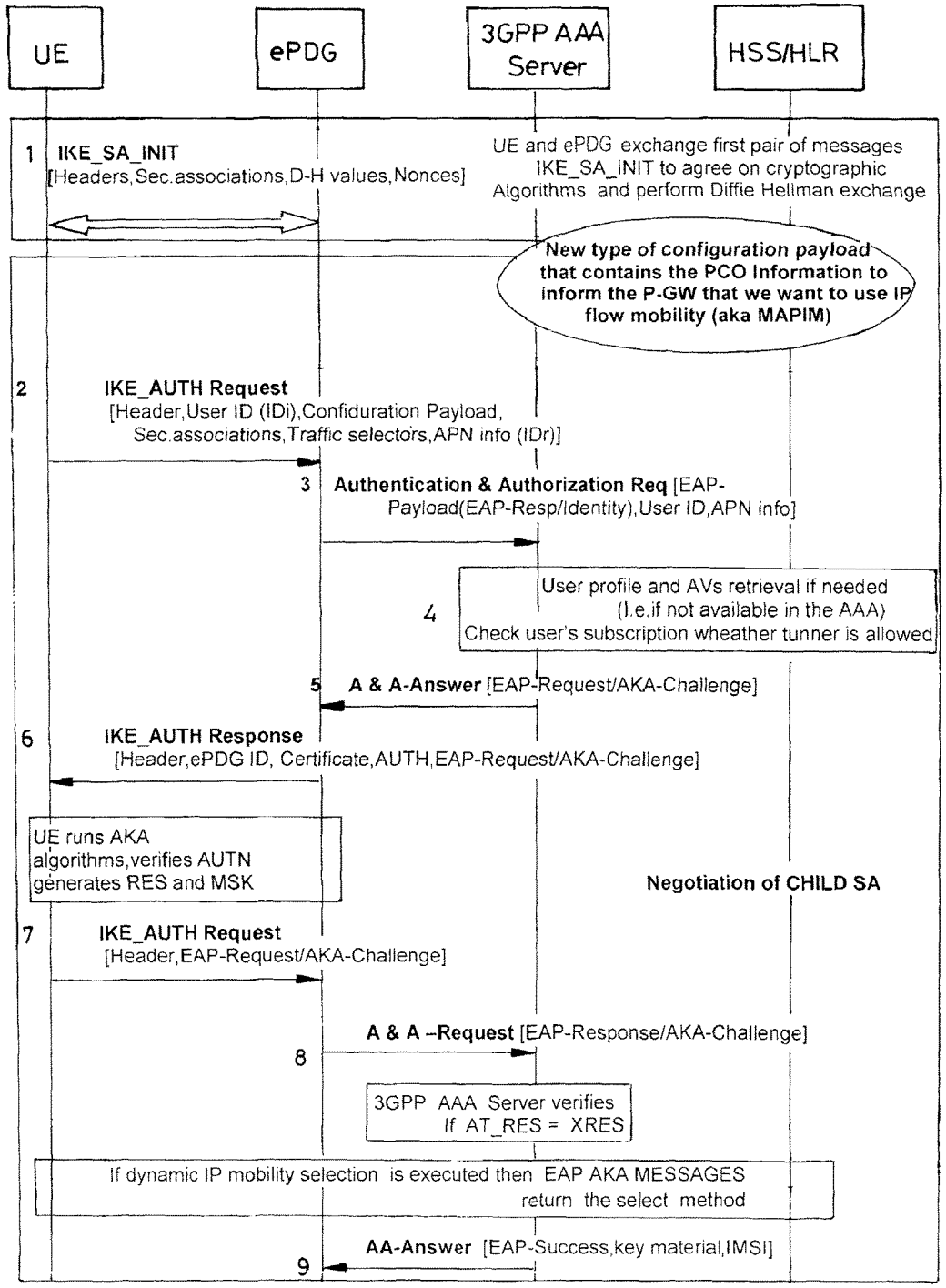
FIG_5

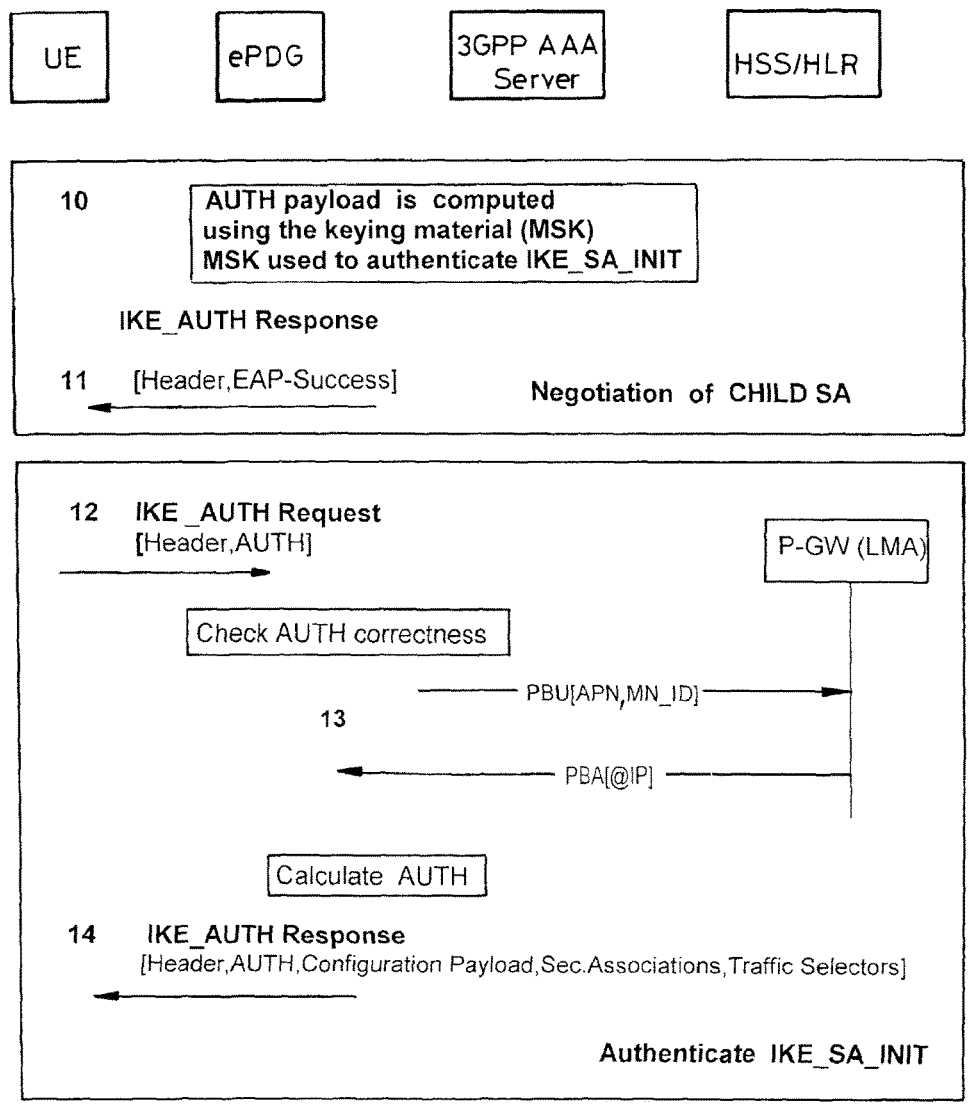
FIG_6

TRANSPORT OF MULTIHOMING SERVICE RELATED INFORMATION BETWEEN USER EQUIPMENT AND 3GPP EVOLVED PACKET CORE

CROSS-REFERENCE TO RELATED APPLICATIONS

This application is a U.S. national stage filing of PCT/EP2011/052267 and is based on European Patent Application No. 10290091.7 filed Feb. 23, 2010, the disclosure of which is hereby incorporated by reference thereto in its entirety, and the priority of which is hereby claimed.

FIELD OF THE INVENTION

Embodiments of the present invention generally relate to communication networks and systems.

Detailed descriptions of communication networks and systems can be found in the literature, such as in particular in Technical Specifications published by standardisation bodies such as for example 3GPP (3rd Generation Partnership Project). In such systems, a User Equipment UE (such as a mobile terminal) has access, via an Access Network, to a Core Network.

Embodiments of the present invention more particularly relates to multi access communication systems, such as for example Evolved Packet System (EPS) including Evolved Packet Core (EPC) that can be accessed by different Access Networks including 3GPP and non 3GPP Access Networks. Examples of 3GPP access technologies include GERAN, UTRAN, HSPA, E-UTRAN, . . . etc. Examples of non 3GPP access technologies include WiFi, WiMAX, CDMA, . . . etc.

EPS is defined in particular in 3GPP TS 23.401 and 3GPP TS 23.402. FIG. 1 illustrates an embodiment for user plane tunnelling within EPS in case of access via 3GPP Access Network or in case of access via untrusted non 3GPP Access Network. In case of access via 3GPP Acccess Network, user plane is tunnelled using GTP (GPRS Tunneling Protocol) between 3GPP Access Network E-UTRAN and Serving Gateway S-GW in EPC, and using GTP across S5 interface between S-GW and PDN Gateway P-GW in EPC. In case of access via untrusted non 3GPP Acccess Network, user plane is tunnelled using IPSec between UE and Evolved Packet Data Gateway ePDG in non 3GPP Access Network (such as WiFi hotspot), and using PMIP across S2b interface between ePDG and P-GW.

S2b interface defines a framework for interconnecting a non-trusted non-3GPP access network (e.g. WiFi network) with the 3GPP EPC. S2b interface is the reference point between the P-GW in 3GPP EPC and the ePDG in non trusted non 3GPP access network. ePDG is the entry point to the mobile core network.

SUMMARY

In such environments, there is a need to enable a user to communicate using multiple accesses (including 3GPP and non 3GPP Access Networks) simultaneously, and to dynamically route to specific accesses individual flows generated by the same or different applications, for example based on the characteristics of the flows, the capabilities of the available accesses, user's preferences, operator's policies . . . etc. This is also also referred to as multi access PDN connectivity and IP flow mobility, or multi-homing service.

FIG. 2 illustrates an example of multi-homing service, wherein different flows such as Flow ID1 and Flow ID2 are exchanged between a Mobile Device (or User Equipment) and the P-GW in 3GPP EPC, via WiFi access network and LTE E-UTRAN Access Network, respectively. For example, a user may thus have e.g. a VoIP session over LTE and e.g. an FTP download via WiFi.

Multihoming service requires exchanging multihoming service related information between a User Equipment and the 3GPP EPC via different Access Networks. However, as recognized by the inventors, while it is currently possible to exchange multi-homing service related information between a mobile device and the P-GW in the 3GPP EPC via 3GPP Access Network (using the existing Protocol Configuration Options PCO field provided by the GTP protocol and the Non Access Stratum NAS for EPS protocol), it is currently not possible to exchange multi-homing service related information between a mobile device and the ePDG in the 3GPP EPC via non trusted non 3GPP access network.

There is a need to enable transport of multihoming service related information between User Equipment and 3GPP EPC through non trusted non 3GPP Access Network. More generally, there is a need to improve multihoming service and therefore quality of service or user experience in such systems.

Embodiments of the present invention in particular address such needs.

These and other objects are achieved, in one aspect of the present invention, in an embodiment, by a method for the transport of multihoming service related information between User Equipment UE and 3GPP Evolved Packet Core EPC through untrusted non 3GPP Access Network, said method comprising a step of:

transporting multihoming service related information using signaling exchanged for security procedures between UE and an evolved Packet Data Gateway ePDG of said untrusted non 3GPP Access Network.

These and other objects are achieved, in other aspects of the present invention, by entities such as User Equipment UE, and network entities such as in particular evolved Packet Data Gateway ePDG, said entities configured, in an embodiment, for performing such method.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 2 is intended to illustrate an example of multi homing service, FIG. 3 is intended to illustrate another embodiment for user plane tunnelling in EPS, FIG. 4 is intended to illustrate initial attachment to untrusted non 3GPP Access Network, in an embodiment of the present invention, FIGS. 5 and 6 are intended to illustrate an example of security procedures performed at initial attach to untrusted non 3GPP Access Network, in an embodiment of the present invention.

DESCRIPTION OF EMBODIMENTS

Figure 1:
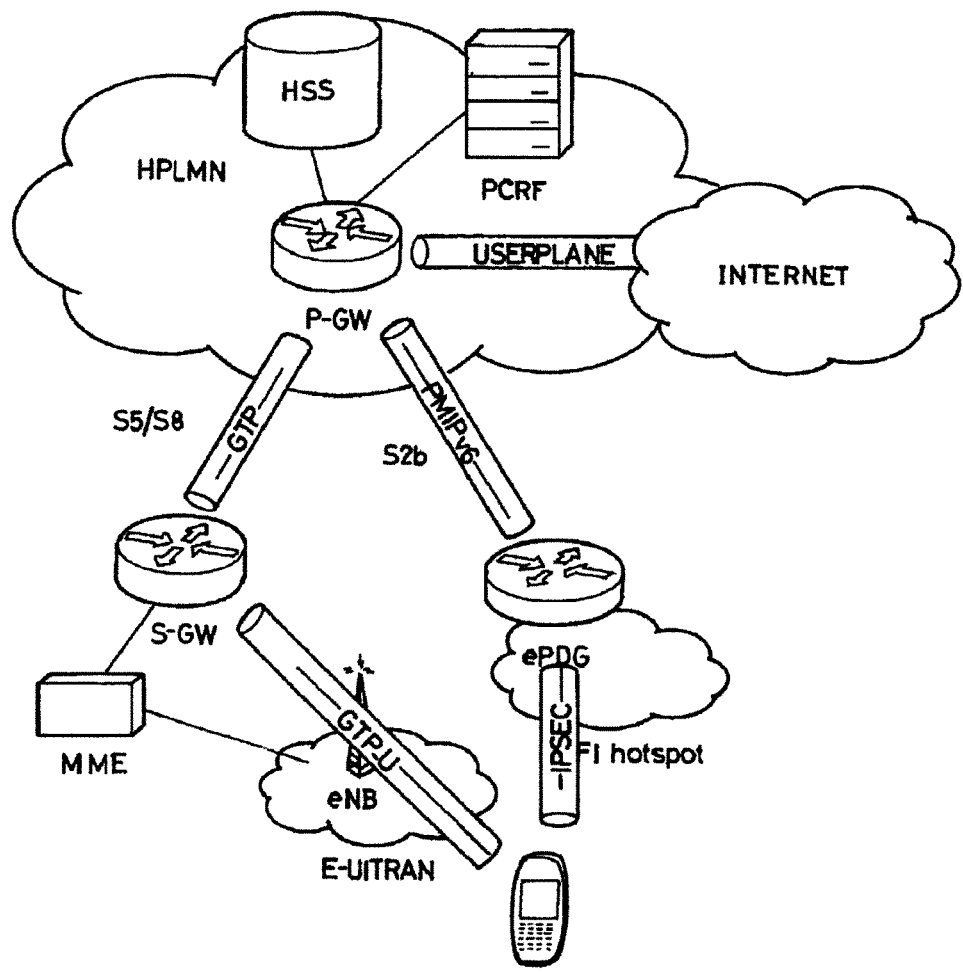
FIG. 1 is intended to illustrate an embodiment for user plane tunnelling in EPS.

As indicated above, in environments such as the one provided by EPS, there is a need to enable a user to communicate using multiple accesses (including 3GPP and non 3GPP Access Networks) simultaneously, and to dynamically route to specific accesses individual flows generated by the same or different applications, for example based on the characteristics of the flows, the capabilities of the available accesses, user's preferences, operator's policies . . . etc. This is also referred to as multi access PDN connectivity and IP flow mobility, or multi-homing service. A description of multi access PDN connectivity and IP flow mobility, or multi-homing service, can be found for example in 3GPP TR 23.861.

As indicated above, multihoming service requires exchanging multihoming service related information between a User Equipment and the 3GPP EPC via different Access Networks. However, as recognized by the inventors, while it is currently possible to exchange multi-homing service related information between a mobile device and the P-GW in the 3GPP EPC via 3GPP Access Network (using the existing Protocol Configuration Options PCO field provided by the GTP protocol), it is currently not possible to exchange multi-homing service related information between a mobile device and the P-GW in the 3GPP EPC via non trusted non 3GPP access network. There is a need to enable transport of multihoming service related information between User Equipment and 3GPP EPC through non trusted non 3GPP Access Network. More generally, there is a need to improve multihoming service and therefore quality of service or user experience in such systems.

Embodiments of the present invention in particular address such needs.

Embodiments of the present invention may be used with different technologies for S2b interface, including PMIP based S2b interface as recalled in the embodiment illustrated in FIG. 1, as well as with a GTP based S2b interface according to the embodiment illustrated in FIG. 3. In the following, by way of example only, the case of a GTP based S2b interface will be more particularly considered. For example, it may be beneficial to have a pure GTP based solution giving simultaneous access to the UE via both LTE and WiFi where both S5 and S2b interfaces run the GTP protocol.

In order to support a full multi-homing service, the ePDG needs to convey to the P-GW multihoming service related information, such as for example, at initial attach to untrusted non 3GPP Access Network, information saying explicitly that the newly attached UE requests multi-homing service and it is not performing handover from a previous network.

In an embodiment, it is proposed to transport multihoming service related information using signaling exchanged for security procedures between UE and ePDG.

Security procedures performed between UE and ePDG are based on IKEv2 protocol. IKEv2 protocol is specified in particular in FRC 4306.

In an embodiment, it is proposed to transport multihoming service related information between UE and ePDG over IKEv2 signalling.

In an embodiment, it is proposed to define options for the IKEv2 signaling to convey the PCO field in order for the UE to be able to convey it to the ePDG. To this end, it is proposed in an embodiment to specify an option of the IKEv2 signalling protocol that can contain the PCO field.

In IKEv2 protocol (RFC4306). Configuration payloads are used to exchange configuration information between IKE peers. In an embodiment, it is proposed to define a new type of configuration payload that will be used to transport the multihoming service related information, also referred to as Protocol Configuration Options PCO information element to use the same notation as with GTP protocol and NAS for EPS protocol.

FIG. 4 is intended to illustrate an example of procedures performed at initial attachment to untrusted non 3GPP Access Network, in an embodiment of the present invention. In particular, FIG. 4 points where the PCO field is transported. Following steps may be provided:

1. The IKEv2 tunnel establishment procedure is started by the UE. The UE indicates in the IKEv2 authentication request that it supports IP flow Mobility (using the dedicated PCO configuration payload).
2. The IKEv2 protocol triggers the GTP tunnel establishment. The ePDG sends a GTP create session request to the PDN-GW containing the same PCO field with the IP flow Mobility indicator. The PDN GW processes the session with this information: it will not perform handover of the session to the new access network, rather update the Bearer Context Table with an additional entry for the same UE.
3. IP-CAN Session establishment procedure
4. Update PDN-GW address
5. Create session response from P-GW to ePDG.
6. IPSec tunnel setup completion.
7. The ePDG sends the final IKEv2 message with the IP address in corresponding IKEv2 Configuration payloads. Since IP flow mobility is considered, this address may be the some as the one that has been previously allocated by the PDN-GW on the initial wireless access (e.g. LTE).
8. IP connectivity from the UE to the PDN GW is now setup. Any packet in the uplink direction is tunnelled to the ePDG by the UE using the IPSec tunnel. The ePDG then tunnels the packet to the PDN GW. From the PDN GW normal IP-based routing takes place. In the downlink direction, the P-GW route packets either to the LTE access or to the WLAN access depending on policy routing. On the WLAN side, the PDN GW tunnels the packet based on the binding cache entry to the ePDG. The ePDG then tunnels the packet to the UE via proper IPsec tunnel.

FIGS. 5 and 6 provide an embodiment for PCO transport through IKEv2 Signaling.

Upon network attachment, the UE performs IKE_SA_INIT to agree on a common secret (e.g. via Diffie Hellmann exchange) with the ePDG. In step 2 the UE sends an IKE_AUTH Request and requests, among others, the configuration of an IP address. The UE also includes a PCO field encoded as described above. This field will be forwarded to the P-GW, which will not perform handover of the session to the new access network, rather update the Bearer Context Table with an additional entry for the same UE. The P-GW will be then in the position to route packets either to the LTE access or to the WLAN access depending on policy routing.

In one aspect, in an embodiment, the present invention provides a method for the transport of multihoming service related information between User Equipment UE and 3GPP Evolved Packet Core EPC through untrusted non 3GPP Access Network, said method comprising a step of:

transporting multihoming service related information using signaling exchanged for security procedures between UE and an evolved Packet Data Gateway ePDG of said untrusted non 3GPP Access Network.

In an embodiment, said signalling includes:

signalling exchanged for negotiating security keys between UE and ePDG.

In an embodiment:
said signaling comprises signalling exchanged according to IKEv2 protocol.

In an embodiment, said method comprises a step of:
a UE sending to ePDG an IKE_AUTH Request containing said information as Configuration Payload.

In an embodiment, said method comprises a step of:
upon reception of said information from UE, ePDG passing said information to a PDN Gateway P-GW in 3GPP EPC.

In an embodiment:
S2b interface between ePDG and PDN Gateway P-GW in 3GPP EPC is based on GTP.

In an embodiment:
S2b interface between ePDG and PDN Gateway P-GW in 3GPP EPC is based is based on PMIP.

In other aspects, embodiments of the present invention provide entities such as User Equipment UE, and network entities such as in particular evolved Packet Data Gateway ePDG, configured, in an embodiment, for performing such method.

In an embodiment, the present invention provides a User Equipment, configured:
for sending multihoming service related information to 3GPP Evolved Packet Core EPC through untrusted non 3GPP Access Network using signaling exchanged for security procedures between UE and an evolved Packet Data Gateway ePDG of said untrusted non 3GPP Access Network.

In an embodiment, the present invention provides an evolved Packet Data Gateway ePDG, configured:
for receiving multihoming service related information sent by a User Equipment UE to 3GPP Evolved Packet Core EPC through untrusted non 3GPP Access Network using signaling exchanged for security procedures between UE and ePDG,
for passing said information to a PDN Gateway P-GW in 3GPP EPC.

Implementation of such configuration does not raise any special problem for a person skilled in the art, and therefore does not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method, comprising:
sending internet protocol flow mobility related information towards a $3^{rd}$ generation partnership project evolved packet core network through an untrusted non-$3^{rd}$ generation partnership project access network, wherein internet protocol flow mobility enables routing of individual internet protocol flows through selected ones of multiple accesses including $3^{rd}$ generation partnership project and non-$3^{rd}$ generation partnership project access networks; and
sending said information using signalling exchanged for security procedures with an evolved packet data gateway,
wherein said information comprises information indicating support of internet protocol flow mobility.

2. A method according to claim 1, wherein said signalling exchanged for security procedures comprises internet key exchange version 2 signalling.

3. A method according to claim 1, comprising:
sending said information in an IKE_AUTH Request.

4. A method according to claim 1, comprising:
sending said information as configuration payload.

5. A method according to claim 1, comprising:
sending said information at initial attachment.

6. A method according to claim 1, wherein said information comprises information indicating a request for internet protocol flow mobility service.

7. An apparatus, comprising:
at least one processor; and
at least one memory including computer program code;
the at least one memory and the computer program code configured to, with the at least one processor, cause the apparatus at least to perform:
sending internet protocol flow mobility related information towards a $3^{rd}$ generation partnership project evolved packet core network through an untrusted non-$3^{rd}$ generation partnership project access network, wherein internet protocol flow mobility enables routing of individual internet protocol flows through selected ones of multiple accesses including $3^{rd}$ generation partnership project and non-$3^{rd}$ generation partnership project access networks, and
sending said information using signalling exchanged for security procedures between the apparatus and an evolved packet data gateway,
wherein said information comprises information indicating the apparatus supports internet protocol flow mobility.

8. An apparatus according to claim 7, wherein said signalling exchanged for security procedures comprises internet key exchange version 2 signalling.

9. An apparatus according to claim 7, the at least one memory and the computer program code being configured to, with the at least one processor, cause the apparatus at least to perform:
sending said information in an IKE_AUTH Request.

10. An apparatus according to claim 7, the at least one memory and the computer program code being configured to, with the at least one processor, cause the apparatus at least to perform:
sending said information as configuration payload.

11. An apparatus according to claim 7, the at least one memory and the computer program code being configured to, with the at least one processor, cause the apparatus at least to perform:
sending said information at initial attachment.

12. An apparatus according to claim 7, wherein said information comprises information indicating the apparatus requests internet protocol flow mobility service.

13. An apparatus, comprising:
at least one processor; and
at least one memory including computer program code;
the at least one memory and the computer program code configured to, with the at least one processor, cause the apparatus at least to perform:
receiving internet protocol flow mobility related information sent by a user equipment towards a $3^{rd}$ generation partnership project evolved packet core network through an untrusted non-3$^{rd}$ generation partnership project access network, wherein internet protocol flow mobility enables routing of individual internet protocol flows through selected ones of multiple accesses including 3$^{rd}$ generation partnership project and non-3$^{rd}$ generation partnership project access networks, receiving said information via signalling exchanged for security procedures between the user equipment and the apparatus, and passing the information to a packet data network gateway in the 3$^{rd}$ generation partnership project evolved packet core network, wherein said information comprises information indicating the user equipment supports internet protocol flow mobility.

14. An apparatus according to claim 13, wherein the signalling exchanged for security procedures comprises internet key exchange version 2 signalling.

15. An apparatus according to claim 13, the at least one memory and the computer program code being configured to, with the at least one processor, cause the apparatus at least to perform:

receiving said information in an IKE_AUTH Request.

16. An apparatus according to claim 13, the at least one memory and the computer program code being configured to, with the at least one processor, cause the apparatus at least to perform:

receiving said information as configuration payload.

17. An apparatus according to claim 13, comprising:

receiving said information at initial attachment.

18. An apparatus according to claim 13, wherein said information comprises information indicating the user equipment requests internet protocol flow mobility service.

* * * * *